United States Patent [19]

Holub et al.

[11] 4,226,950
[45] Oct. 7, 1980

[54] PLASTICIZED, IMPACT MODIFIED POLYCARBONATES

[75] Inventors: Fred F. Holub, Schenectady, N.Y.; Phillip S. Wilson, Louisville, Ky.

[73] Assignee: General Electric Company, Pittsfield, Mass.

[21] Appl. No.: 922,305

[22] Filed: Jul. 6, 1978

[51] Int. Cl.$^2$ .............................................. C08L 67/06
[52] U.S. Cl. ........................................ 525/67; 525/63; 525/68; 525/146; 525/148; 525/166
[58] Field of Search ...................... 260/873; 528/302; 525/63, 67, 68, 146, 148, 166

[56] References Cited

U.S. PATENT DOCUMENTS

| | | | |
|---|---|---|---|
| 3,372,148 | 3/1969 | Wiener | 528/302 |
| 3,801,673 | 4/1974 | O'Connell | 260/873 |
| 3,864,428 | 2/1975 | Yakamura et al. | 260/873 |

*Primary Examiner*—J. Ziegler
*Attorney, Agent, or Firm*—Salvatore C. Mitri; William F. Mufatti

[57] ABSTRACT

Novel thermoplastic molding compositions are disclosed which comprise
  (a) a bisphenol-A polycarbonate;
  (b) an alcohol terminated polyester of neopentyl glycol (2,2-dimethyl-1,3-propane-diol) and adipic acid; in admixture with
  (c) a minor amount of at least one component selected from the group comprising polyolefins, olefin based copolymers and olefin based terpolymers, such as, ethylene-propylene copolymers, ethylene-butadiene copolymers, propylene-butadiene copolymers, ethylene-propylene-butadiene terpolymers, ethylene-acrylic acid copolymers, propylene-acrylic acid copolymers, ethylene-ethyl acrylate copolymers, ethylene-vinyl acetate copolymers and ethylene-propylene-acrylic acid terpolymers; or
  (d) an amount of at least one component selected from the group comprising methyl methacrylate-butadiene-styrene copolymers, methyl methacrylate-acrylonitrile-butadiene-styrene copolymers and acrylonitrile-butadiene-styrene copolymers.

9 Claims, No Drawings

PLASTICIZED, IMPACT MODIFIED POLYCARBONATES

This invention relates to thermoplastic molding compositions having improved processability and notched Izod impact strength characteristics comprising (a) a bisphenol-A polycarbonate;

(b) an alcohol terminated polyester of neopentyl glycol (2,2-dimethyl-1,3-propane-diol) and adipic acid; in admixture with (c) a minor amount of at least one component selected from the group comprising polyolefins, olefin based copolymers and olefin based terpolymers, such as, ethylene-propylene copolymers, ethylene-butadiene copolymers, propylene-butadiene copolymers, ethylene-propylene-butadiene terpolymers, ethylene-acrylic acid copolymers, propylene-acrylic acid copolymers, ethylene-ethyl acrylate copolymers, ethylene-vinyl acetate copolymers and ethylene-propylene-acrylic acid terpolymers; or (d) an amount of at least one component selected from the group comprising methyl methacrylate-butadiene-styrene copolymers, methyl methacrylate-acrylonitrile-butadiene-styrene copolymers and acrylonitrile-butadiene-styrene copolymers.

BACKGROUND OF THE INVENTION

Bisphenol-A polycarbonate polymers are excellent molding materials as products made therefrom have relatively high impact strength, toughness, high transparency, wide temperature limits (high impact resistance below −60° C. and a UL thermal endurance rating of 115° C. with impact), good dimensional stability, high creep resistance and electrical properties which qualify it as sole support for current carrying parts.

Bisphenol-A polycarbonates are, however, very difficult to fabricate from melts for the reason that melts thereof have exceptionally high viscosities. Attempts to overcome this difficulty by the incorporation into the polycarbonate of materials known to reduce the viscosity of other resins have very generally been unseccesful. Many standard viscosity control agents appear to have little or no effect on the viscosity of polycarbonates. Some compounds, which are conventionally employed to improve the workability of polymers, produce an embrittling effect on polycarbonates when they are mixed therewith and the mixture is subjected to elevated temperatures as in molding. Still other materials, while satisfactory stiffness modifying agents for other plastics, are too volatile to be incorporated into polycarbonates since polycarbonates have much higher melting points than many other thermoplastics.

It has now been found that the incorporation of a relatively minor amount of an oligomeric ester plasticizer, such as, an alcohol terminated oligomeric ester of neopentyl glycol (2,2-dimethyl-1,3-propane-diol) and adipic acid in admixture with a minor amount of an olefinic impact modifier, such as, for example, polyolefins, olefin based copolymers and olefin based terpolymers, such as, ethylene-propylene copolymers, ethylene-butadiene copolymers, propylene-butadiene copolymers, ethylene-propylene-butadiene terpolymers, ethylene-acrylic acid copolymers, propylene-acrylic acid copolymers, ethylene-ethyl acrylate copolymers, ethylene-vinyl acetate copolymers and ethylene-propylene-acrylic acid terpolymers; or in admixture with an amount of an acrylic rubber impact modifier, such as, for example, methyl methacrylate-butadiene-styrene copolymers, methyl methacrylate-acrylonitrile-butadiene-styrene copolymers, and acrylonitrile-butadiene-styrene copolymers; into a bisphenol-A polycarbonate will significantly improve the processability of the resultant polycarbonate molding material and, at the same time, provide a material having improved notched Izod impact strength characteristics.

DESCRIPTION OF THE INVENTION

The present invention provides for a novel thermoplastic molding composition which comprises (a) a bisphenol-A polycarbonate;

(b) an alcohol terminated polyester of neopentyl glycol (2,2-dimethyl-1,3-propane-diol) and adipic acid; in admixture with (c) a minor amount of at least one component selected from the group comprising polyolefins, olefin based copolymers and olefin based terpolymers, such as, ethylene-propylene copolymers, ethylene-butadiene copolymers, propylene-butadiene copolymers, ethylene-propylene-butadiene terpolymers, ethylene-acrylic acid copolymers, propylene-acrylic acid copolymers, ethylene-ethyl acrylate copolymers, ethylene-vinyl acetate copolymers and ethylene-propylene-acrylic acid terpolymers; or (d) an amount of at least one component selected from the group comprising methyl methacrylate-butadiene-styrene copolymers, methyl methacrylate-acrylonitrile-butadiene-styrene copolymers and acrylonitrile-butadiene-styrene copolymers.

The polycarbonate resin has recurring units of the formula

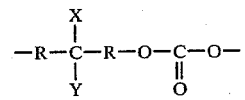

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining

atom form a cycloalkane radical, the total number of carbon atoms in X and Y being up to 12.

The preferred polycarbonate resins may be derived from the reaction of bisphenol-A and phosgene. These polycarbonates have from 10–400 recurring units of the formula:

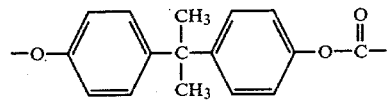

The polycarbonates are described in U.S. Pat. Nos. 3,028,365; 3,334,154 and 3,915,926 all of which ar incorporated by reference. The polycarbonate should have an intrinsic viscosity between 0.2 and 1.0, preferably from 0.30 to 0.65 as measured at 20° C. in methylene chloride.

The oligomeric ester plasticizers useful in the composition of the present invention will have molecular weights in the range of from 200 to 20,000 and preferably from about 500 to about 5,000.

The preferred oligomeric ester plasticizer for use in the compositions of the present invention is KODAFLEX® NP-10 manufactured and sold by Eastman Chemical Products. KODAFLEX® NP-10 is an alcohol terminated oligomeric ester of neopentyl glycol (2,2-dimethyl-1,3-propane-diol) and adipic acid.

The oligomeric ester component may be present in an amount from about 0.1 to about 10 weight percent based upon the polycarbonate and preferably will be present in an amount from about 1 to about 5 weight percent.

The polyolefin copolymers, such as ethylene-propylene copolymers, and olefin terpolymers, such as ethylene-propylene-butadiene terpolymers, which may be suitably employed in practicing the present invention are all commercially available products whose preparation is well known.

The olefin-acrylic acid copolymers, such as ethylene-acrylic acid copolymers, and diolefin-acrylic acid terpolymers, such as ethylene-propylene-acrylic acid terpolymers, and other olefin based thermoplastic elastomers, which may be suitably employed in practicing the present invention are also commercially available products whose preparation is well known, as will be readily apparent to those skilled in the art.

Exemplary of various commercially available products which may be advantageously employed as olefinic impact modifying agents in practicing the present invention are the following compositions:

PROFAX® 6301, PROFAX® 6601, PROFAX® 6701 and PROFAX® 6801, all propylene homopolymers; PROFAX® 7601 and PROFAX® 8601, both ethylene-propylene block copolymers; all of which are manufactured and sold by Hercules, Inc.;

USI® LB 342 and USI® LB 703, both ethylene homopolymers, manufactured and sold by USI Chemicals;

DOW® EAA 435, DOW® EAA 449, DOW® EAA 455, DOW® EAA 459, DOW® XD 2375.28 and DOW® XD 2375.29; all ethylene-acrylic acid copolymers manufactured and sold by the Dow Chemical Company;

MICROTHENE® FN 510, an ethylene homopolymer;

MICROTHENE® Fe 532, an ethylene-vinyl acetate copolymer;

VYNATHENE® EY 901, VYNATHENE® EY 902, VYNATHENE® EY 903, VYNATHENE® EY 904, VYNATHENE® EY 905, all ethylene-vinyl acetate copolymers, manufactured and sold by USI Chemicals;

DEXON® 1004, a propylene-acrylic acid copolymer, manufactured and sold by Exxon Chemicals;

SOMEL® 401T, SOMEL® 402T and SOMEL® 301G, all olefin based thermoplastic elastomers, manufactured and sold by the Du Pont Company; and EPOLENE® C-17, an olefin oligomer, manufactured and sold by Eastman Chemical Products.

The compositions of the present invention may contain from about 0.1 to about 10 percent by weight of the combined olefinic impact modifying component(s) described above, based upon the weight of polycarbonate, without taking into account the amount of plasticizer or agents which may be employed, and will preferentially contain from about 2 to about 6 percent by weight of the combined olefinic impact modifying component(s).

The acrylic rubber components such as methyl methacrylate-butadiene-styrene, methyl methacrylate-acrylonitrile-butadiene-styrene and acrylonitrile-butadiene-styrene which may be suitably employed in practicing the present invention are all commercially available products whose preparation is well known.

The acrylic rubber impact modifying agent may be present in an amount from about 0.1 to about 50 weight percent based upon the polycarbonate and preferably will be present in an amount from about 2 to about 20 weight percent.

Exemplary of various commercially available products which may be advantageously employed as acrylic rubber impact modifying agents in practicing the present invention are the following compositions:

BLENDEX® 111N and BLENDEX® 111S, both methyl methacrylate-butadiene-styrene copolymers, manufactured and sold by Borg-Warner Corporation;

BLENDEX® 436, a methyl methacrylate acrylonitrile-butadiene-styrene copolymer, manufactured and sold by Borg-Warner Corporation; and ACRYLOID® KM 611, a methyl methacrylate-butadiene-styrene copolymer, manufactured and sold by Rohm & Haas.

The compositions of the present invention may be prepared by any standard procedure and the particular method employed is not critical.

The compositions of the present invention may also include flame retardants such as those described in U.S. Pat. No. 3,915,926 which is incorporated herein by reference.

As will be apparent to one skilled in the art, other materials may also be advantageously employed in admixture with the bisphenol-A polycarbonate compositions of the present invention and include such materials as anti-static agents, pigments, thermal stabilizers, ultraviolet stabilizers, reinforcing fillers and the like.

DESCRIPTION OF THE PREFERRED EMBODIMENTS

The following examples are set forth to further illustrate the present invention and are not to be construed as limiting the invention thereto.

EXAMPLE I—CONTROL 100 parts by weight of a bisphenol-A polycarbonate having an IV of 0.51, was prepared, extruded in a twin screw extruder and molded into sample parts of approximately ⅛ inch thickness. The results of melt flow rate test performed according to the procedure set forth in ASTM D-1238, condition 0, and notched Izod impact test performed in accordance with ASTM D-256 on this material are given in Table I.

EXAMPLES II–III

Various blends of a bisphenol-A polycarbonate having an IV of 0.51, and varying amounts of KODAFLEX® NP-10 were prepared, extruded and molded into sample parts in the same manner as was done in Example I. The results of melt flow rate and notched Izod impact test performed on the resultant materials are set forth in Table I.

EXAMPLE IV—CONTROL 100 parts by weight of a bisphenol-A polycarbonate having an IV of 0.46 was prepared, extruded and molded into sample parts in the same manner as was done in Example I. The results of melt flow rate and notched Izod impact tests performed are set forth in Table I.

EXAMPLE V

A blend of 95 parts by weight of a bisphenol-A polycarbonate having an IV of 0.46 and 5 parts by weight of KODAFLEX® NP-10 was prepared, extruded in a twin screw extruder and molded into sample parts in the same manner as was done in the previous examples. The results of melt flow rate and notched Izod impact tests performed on this material are set forth in Table I.

TABLE I
EXAMPLES I-V
EFFECT OF PLASTICIZER ONLY

| COMPOSITION (parts by weight) | EXAMPLE I | EXAMPLE II | EXAMPLE III | EXAMPLE IV | EXAMPLE V |
|---|---|---|---|---|---|
| Poly (BPA Carbonate)[a] | 100 | 98 | 95 | — | — |
| Poly (BPA Carbonate)[b] | — | — | — | 100 | 95 |
| KODAFLEX® NP-10 | — | 2 | 5 | — | 5 |
| PROPERTIES | | | | | |
| Melt Flow Rate (Gr./10 min.) | 10.1 | 13.7 | 33.3 | 13.5 | 38.4 |
| Notched Izod ⅛" (Ft-lb/in.) | 15.2 | 1.8 | 1.0 | 14.7 | 0.9 |

[a] IV = 0.51
[b] IV = 0.46

EXAMPLE VI—CONTROL 100 parts by weight of a bisphenol-A polycarbonate having an IV of 0.51 was prepared, extruded in a twin screw extruder and molded into sample parts of approximately ⅛ inch and ¼ inch thickness in the same manner as was done in the previous examples. The results of melt flow rate and notched Izod impact tests performed on the resultant material are set forth in Table II.

EXAMPLES VII-XXII

Various blends of a bisphenol-A polycarbonate having an IV of 0.51 and various quantities of different olefinic impact modifiers as set forth in Table II were prepared, extruded and molded into sample parts of ⅛ inch and ¼ inch thickness in the same manner as was done in the previous examples. The results of notched Izod impact tests performed on these materials are also set forth in Table II.

EXAMPLE XXIII—CONTROL 100 parts by weight of a bisphenol-A polycarbonate having an IV of 0.46 was prepared, extruded and molded into sample parts of ⅛ inch and ¼ inch thickness in the same manner as was done in the previous examples. The results of melt flow rate and notched Izod impact tests performed on this material are set forth in Table II.

EXAMPLES XXIV-XXIX

Various blends of a bisphenol-A polycarbonate having an IV of 0.46 and various amounts of different olefinic impact modifying agents as set forth in Table II were prepared, blended and molded in sample parts of ⅛ inch and ¼ inch thickness. The results of melt flow rate and notched Izod impact tests performed on these materials are also set forth in Table II.

TABLE II
EXAMPLES VI-XXIX
EFFECT OF OLEFINIC IMPACT MODIFIERS ONLY

| COMPOSITION (parts by weight) | EXAMPLE VI | EXAMPLE VII | EXAMPLE VIII | EXAMPLE IX | EXAMPLE X |
|---|---|---|---|---|---|
| Poly (BPA Carbonate)[a] | 100 | 95 | 95 | 95 | 100 |
| Impact Modifier Type | — | PROFAX® 6601 | PROFAX® 7601 | PROFAX® 8601 | PROFAX® 6801 |
| Amount | — | 5 | 5 | 5 | 3 |
| PROPERTIES | | | | | |
| Melt Flow Rate (Gr./10 min.) | 10.1 | 13.2 | 13.0 | 12.3 | 11.9 |
| Notched Izod ⅛" (Ft-lb/in.) | 15.2 | 13.2 | 14.0 | 14.0 | 14.7 |
| Notched Izod ¼" (Ft-lb/in.) | 2.0 | 11.1 | 11.1 | 11.6 | 11.9 |

| COMPOSITION (parts by weight) | EXAMPLE XI | EXAMPLE XII | EXAMPLE XIII | EXAMPLE XIV | EXAMPLE XV |
|---|---|---|---|---|---|
| Poly (BPA Carbonate)[a] | 100 | 100 | 100 | 100 | 100 |
| Impact Modifier Type | PROFAX® 6301 | PROFAX® 6301 | PROFAX® 6301 | VYNATHENE® EY 901 | VYNATHENE® EY 902 |
| Amount | 2 | 4 | 6 | 4 | 4 |
| PROPERTIES | | | | | |
| Melt Flow Rate (Gr./10 min.) | 10.5 | 12.0 | 15.3 | 13.3 | 13.5 |
| Notched Izod ⅛" (Ft-lb/in.) | 14.1 | 14.0 | 14.0 | — | — |
| Notched Izod ¼" (Ft-lb/in.) | 8.0 | 10.6 | 9.5 | 14.3 | 13.9 |

| COMPOSITION (parts by weight) | EXAMPLE XVI | EXAMPLE XVII | EXAMPLE XVIII | EXAMPLE XIX | EXAMPLE XX |
|---|---|---|---|---|---|
| Poly (BPA Carbonate)[a] | 100 | 100 | 100 | 100 | 100 |
| Impact Modifier Type | VYNATHENE® EY 903 | VYNATHENE® EY 904 | VYNATHENE® EY 905 | MICROTHENE® FN 510 | MICROTHENE® FN 510 |
| Amount | 4 | 4 | 4 | 2 | 4 |
| PROPERTIES | | | | | |
| Melt Flow Rate | 13.1 | 12.6 | 13.2 | 11.1 | 12.2 |

TABLE II-continued
EXAMPLES VI-XXIX
EFFECT OF OLEFINIC IMPACT MODIFIERS ONLY

| | | | | | |
|---|---|---|---|---|---|
| (Gr./10 min.) | | | | | |
| Notched Izod ¼" (Ft-lb/in.) | 15.3 | 15.0 | 14.6 | 3.3 | 10.5 |

| COMPOSITION (parts by weight) | EXAMPLE XXI | EXAMPLE XXII | EXAMPLE XXIII | EXAMPLE XXIV | EXAMPLE XXV |
|---|---|---|---|---|---|
| Poly (BPA Carbonate)$^{a/b}$ | 100$^a$ | 100$^a$ | 100$^b$ | 100$^b$ | 100$^b$ |
| Impact Modifier Type | MICROTHENE ® FE 532 | MICROTHENE ® FE 532 | — | PROFAX ® 6801 | PROFAX ® 6801 |
| Amount | 2 | 4 | — | 3.5 | 4.3 |
| PROPERTIES | | | | | |
| Melt Flow Rate (Gr./10 min.) | 11.3 | 12.1 | 13.5 | 18.3 | 22.0 |
| Notched Izod ⅛" (Ft-lb/in.) | — | — | 14.7 | 12.9 | 9.3 |
| Notched Izod ¼" (Ft-lb/in.) | 3.2 | 11.8 | 2.0 | 9.6 | 9.6 |

| COMPOSITION (parts by weight) | EXAMPLE XXVI | EXAMPLE XXVII | EXAMPLE XXVIII | EXAMPLE XXIX |
|---|---|---|---|---|
| Poly (BPA Carbonate)$^b$ | 100 | 100 | 100 | 100 |
| Impact Modifier Type | PROFAX ® 6601 | DEXON ® 1004 | DEXON ® 1004 | DEXON ® 1004 |
| Amount | 4.3 | 2 | 4 | 6 |
| PROPERTIES | | | | |
| Melt Flow Rate (Gr./10 min.) | 17.4 | 16.7 | 18.0 | 19.3 |
| Notched Izod ⅛" (Ft-lb/in.) | 12.7 | 14.0 | 13.2 | 12.7 |
| Notched Izod ¼" (Ft-lb/in.) | 10.0 | 2.6 | 9.6 | 9.1 |

$^a$IV = 0.51
$^b$IV = 0.46

EXAMPLES XXX-XXXIX

Various blends of a bisphenol-A polycarbonate having an IV of 0.51 in admixture with various olefinic impact modifying agents in varying amounts together with varying amounts of KODAFLEX ® NP-10 were prepared, extruded and molded into sample parts of ⅛ inch and ¼ inch thickness in the same manner as was done in previous examples. The results of melt flow rate and notched Izod impact tests performed on these materials are set forth in Table III.

EXAMPLES XL-XLIV

Various blends of a bisphenol-A polycarbonate having an IV of 0.46 in admixture with various olefinic impact modifying agents in varying amounts together with varying amounts of KODAFLEX ® NP-10 as set forth in Table II were prepared, extruded and molded into sample parts of ⅛ inch and ¼ inch thickness in the same manner as was done in the previous examples. The results of melt flow rate and notched Izod impact tests performed on these materials are also set forth in Table III.

TABLE III
EXAMPLES XXX-XLIV
EFFECT OF PLASTICIZER IN COMBINATION WITH OLEFINIC IMPACT MODIFIERS

| COMPOSITION (parts by weight) | EXAMPLE XXX | EXAMPLE XXXI | EXAMPLE XXXII | EXAMPLE XXXIII | EXAMPLE XXXIV |
|---|---|---|---|---|---|
| Poly (BPA Carbonate)$^a$ | 100 | 100 | 100 | 100 | 100 |
| Impact Modifier Type | PROFAX ® 6601 | PROFAX ® 6701 | PROFAX ® 6801 | PROFAX ® 6601 | PROFAX ® 6801 |
| Amount | 3 | 3 | 3 | 4.3 | 2 |
| KODAFLEX ® NP-10 | 3 | 3 | 3 | 2 | 2 |
| PROPERTIES | | | | | |
| Melt Flow Rate (Gr/10 min.) | 17.8 | 17.5 | 21.4 | 21.4 | 14.1 |
| Notched Izod ⅛" (Ft-lb/in.) | 11.7 | 9.9 | 2.5 | 11.2 | 14.0 |
| Notched Izod ¼" (Ft-lb/in.) | 3.1 | 2.9 | 3.0 | 9.0 | 2.0 |

| COMPOSITION (parts by weight) | EXAMPLE XXXV | EXAMPLE XXXVI | EXAMPLE XXXVII | EXAMPLE XXXVIII | EXAMPLE XXXIX |
|---|---|---|---|---|---|
| Poly (BPA Carbonate)$^a$ | 100 | 100 | 100 | 100 | 100 |
| Impact Modifier Type | PROFAX ® 6801 | PROFAX ® 6801 | PROFAX ® 6801 | USI ® LB 703 | DEXON ® 1004 |
| Amount | 3 | 4 | 4 | 3 | 4.3 |
| KODAFLEX ® NP-10 | 2 | 2 | 3 | 3 | 2 |
| PROPERTIES | | | | | |
| Melt Flow Rate | 15.5 | 15.1 | 16.2 | 13.7 | 25.0 |

TABLE III-continued
EXAMPLES XXX-XLIV
EFFECT OF PLASTICIZER IN COMBINATION WITH OLEFINIC IMPACT MODIFIERS

|  |  |  |  |  |  |
|---|---|---|---|---|---|
| (Gr/10 min.) |  |  |  |  |  |
| Notched Izod ⅛" | 12.7 | 13.3 | 11.3 | 12.8 | 9.9 |
| (Ft-lb/in.) |  |  |  |  |  |
| Notched Izod ¼" | 3.5 | 9.6 | 10.5 | 3.6 | 4.6 |
| (Ft-lb/in.) |  |  |  |  |  |

| COMPOSITION (parts by weight) | EXAMPLE XL | EXAMPLE XLI | EXAMPLE XLII | EXAMPLE XLIII | EXAMPLE XLIV |
|---|---|---|---|---|---|
| Poly (BPA Carbonate)[b] | 100 | 100 | 100 | 100 | 100 |
| Impact Modifier | PROFAX® | PROFAX® | PROFAX® | PROFAX® | DEXON® |
| Type | 6601 | 6601 | 6801 | 6801 | 1004 |
| Amount | 4.3 | 4.3 | 4.3 | 4.3 | 4 |
| KODAFLEX® NP-10 | 1 | 2 | 1 | 2 | 1 |
| PROPERTIES |  |  |  |  |  |
| Melt Flow Rate | 17.5 | 19.4 | 18.9 | 22.2 | 21.5 |
| (Gr/10 min.) |  |  |  |  |  |
| Notched Izod ⅛" | 12.7 | 12.0 | 9.3 | 6.9 | 12.0 |
| (Ft-lb/in.) |  |  |  |  |  |
| Notched Izod ¼" | 9.8 | 9.7 | 9.6 | 6.0 | 8.7 |
| (Ft-lb/in.) |  |  |  |  |  |

[a] IV = 0.51
[b] IV = 0.46

EXAMPLES XLV–XLVIII

Various blends of bisphenol-A polycarbonate having an IV of 0.51 along with 5 parts by weight of various acrylic rubber modifying agents as set forth in Table IV were prepared, extruded and molded into sample parts of ⅛ inch and ¼ inch thickness in the same manner as was done in previous examples. The results of melt flow rate and notched Izod impact tests on these materials is also set forth in Table IV.

EXAMPLES XLIX–LII

Various blends of a bisphenol-A polycarbonate having an IV of 0.51 in admixture with 5 parts by weight of various acrylic rubber impact modifying agents as set forth in Table V and 5 parts by weight of KODAFLEX® NP-10 were prepared, extruded and molded into sample parts of ⅛ inch and ¼ inch thickness in the same manner as was done in previous examples. The results of melt flow rate and notched Izod impact tests performed on these materials are also set forth in Table V.

EXAMPLES LIII–LXV

Various blends of bisphenol-A polycarbonate having an IV of 0.46 in admixture with various acrylic rubber impact modifying agents in various amounts together with varying amounts of KODAFLEX® NP-10 as set forth in Table V were prepared, extruded and molded into sample parts of ⅛ inch and ¼ inch thickness in the same manner as was done in previous examples. The results of melt flow rate and notched Izod impact tests performed on these materials are also set forth in Table V.

TABLE IV
EXAMPLES XLV–XLVIII
EFFECT OF ACRYLIC RUBBER IMPACT MODIFIERS ONLY

| COMPOSITION (parts by weight) | EXAMPLE XLV | EXAMPLE XLVI | EXAMPLE XLVII | EXAMPLE XLVIII |
|---|---|---|---|---|
| Poly (BPA Carbonate)[a] | 95 | 95 | 95 | 95 |
| Impact Modifier | BLENDEX® | BLENDEX® | ACRYLOID® | ACRYLOID® |
| Type | 111S | 111N | KM611 | KM611 |
| Amount | 5 | 5 | 5 | 5 |
| PROPERTIES |  |  |  |  |
| Melt Flow Rate | 11.1 | 10.4 | 10.5 | 9.9 |
| (Gr/10 min.) |  |  |  |  |
| Notched Izod ⅛" | 13.3 | 13.5 | 12.6 | 11.9 |
| (Ft-lb/in.) |  |  |  |  |
| Notched Izod ¼" | 12.6 | 12.4 | 11.3 | 10.6 |
| (Ft-lb/in.) |  |  |  |  |

[a] IV = 0.51

TABLE V
EXAMPLES XLIX–LXV
EFFECT OF PLASTICIZER IN COMBINATION WITH ACRYLIC RUBBER IMPACT MODIFIERS

| COMPOSITION (parts by weight) | EXAMPLE XLIX | EXAMPLE L | EXAMPLE LI | EXAMPLE LII |
|---|---|---|---|---|
| Poly (BPA Carbonate)[a] | 90 | 90 | 90 | 90 |
| Impact Modifier | ACRYLOID® | BLENDEX® | BLENDEX® | BLENDEX® |
| Type | KM611 | 436 | 111S | 111N |
| Amount | 5 | 5 | 5 | 5 |
| KODAFLEX® NP-10 | 5 | 5 | 5 | 5 |
| PROPERTIES |  |  |  |  |
| Melt Flow Rate | 18.4 | 19.5 | 24.7 | 18.5 |
| (Gr/10 min.) |  |  |  |  |

TABLE V-continued
EXAMPLES XLIX-LXV
EFFECT OF PLASTICIZER IN COMBINATION WITH ACRYLIC RUBBER IMPACT MODIFIERS

| | | | | |
|---|---|---|---|---|
| Notched Izod ⅛" (Ft-lb/in.) | 12.3 | 11.2 | 12.2 | 12.6 |
| Notched Izod ¼" (Ft-lb/in.) | 2.4 | 2.7 | 3.4 | 3.4 |

| COMPOSITION (parts by weight) | EXAMPLE LIII | EXAMPLE LIV | EXAMPLE LV | EXAMPLE LVI | EXAMPLE LVII |
|---|---|---|---|---|---|
| Poly (BPA Carbonate)$^b$ | 95 | 90 | 95 | 90 | 95 |
| Impact Modifier Type | BLENDEX® 111S | BLENDEX® 111S | BLENDEX® 436 | BLENDEX® 436 | BLENDEX® 111N |
| Amount | 5 | 10 | 5 | 10 | 5 |
| KODAFLEX® NP-10 | 2 | 2 | 2 | 2 | 2 |
| PROPERTIES | | | | | |
| Melt Flow Rate (Gr/10 min.) | 17.1 | 15.7 | 19.6 | 14.5 | 20.2 |
| Notched Izod ⅛" (Ft-lb/in.) | 11.9 | 10.7 | 11.3 | 11.3 | 11.3 |
| Notched Izod ¼" (Ft-lb/in.) | 9.2 | 9.3 | 3.0 | 9.5 | 4.8 |

| COMPOSITION (parts by weight) | EXAMPLE LVIII | EXAMPLE LIX | EXAMPLE LX | EXAMPLE LXI |
|---|---|---|---|---|
| Poly (BPA Carbonate)$^b$ | 90 | 95 | 90 | 92 |
| Impact Modifier Type | BLENDEX® 111N | ACRYLOID® KM611 | ACRYLOID® KM611 | ACRYLOID® KM611 |
| Amount | 10 | 5 | 10 | 5 |
| KODAFLEX® NP-10 | 2 | 2 | 2 | 3 |
| PROPERTIES | | | | |
| Melt Flow Rate (Gr/10 min.) | 18.9 | 15.7 | 16.1 | 19.3 |
| Notched Izod ⅛" (Ft-lb/in.) | 10.9 | 12.0 | 11.9 | 11.3 |
| Notched Izod ¼" (Ft-lb/in.) | 8.8 | 8.8 | 10.8 | — |

| COMPOSITION (parts by weight) | EXAMPLE LXII | EXAMPLE LXIII | EXAMPLE LXIV | EXAMPLE LXV |
|---|---|---|---|---|
| Poly (BPA Carbonate)$^b$ | 92 | 92 | 92 | 92 |
| Impact Modifier Type | BLENDEX® 111S | BLENDEX® 111N | BLENDEX® 111S | BLENDEX® 111S |
| Amount | 5 | 5 | 5 | 5 |
| KODAFLEX® NP-10 | 3 | 3 | 3 | 3 |
| PROPERTIES | | | | |
| Melt Flow Rate (Gr/10 min.) | 22.8 | 22.7 | 22.3 | 20.6 |
| Notched Izod ⅛" (Ft-lb/in.) | 11.3 | 11.3 | 11.3 | 12.0 |

$^a$IV = 0.51
$^b$IV = 0.46

Although the above examples show various modifications of the present invention, other variations are possible in light of the above teachings.

It is, therefore, to be understood that changes may be made in the particular embodiment of the invention described which are within the full intended scope of the invention, as defined by the appended claims.

We claim:
1. A thermoplastic molding composition comprising:
   (a) a bisphenol-A polycarbonate having an I.V. of about 0.2-1.0;
   (b) about 0.1-10 weight percent based upon said polycarbonate of an oligomeric ester plasticizer: 2,2-dimethyl-1,3propane-diol and adipic acid; in admixture with
   (c) an impact modifier of about 0.1-10 weight percent based upon said polycarbonate of at least one component selected from the group consisting of polyolefins, olefin based copolymers and olefin based terpolymers, or
   (d) about 0.1-50 weight percent based upon said polycarbonate of at least one component selected from the group consisting of methyl methacrylate-butadiene-styrene copolymers, methyl methacrylate-acrylonitrile-butadiene-styrene copolymers and acrylonitrile-butadiene-styrene copolymers.
2. The composition of claim 1 wherein the impact modifier (c) is selected from the group consisting of ethylene-propylene copolymers, ethylene-butadiene copolymers, propylene-butadiene copolymers, ethylene-propylene-butadiene terpolymers, ethylene-acrylic acid copolymers, propylene-acrylic acid copolymers, ethylene-ethyl acrylate copolymers, ethylene-vinyl acetate copolymers and ethylene-propylene-acrylic acid terpolymers.
3. The composition of claim 2 wherein the impact modifier is component (c).
4. The composition of claim 2 wherein the impact modifier is component (d).
5. The composition of claim 2 wherein (c) is selected from the group consisting essentially of ethylene-acrylic acid copolymers, propylene-acrylic acid copolymers, ethylene-ethyl acrylate copolymers, ethylene-vinyl acetate copolymers and ethylene-propylene acrylic acid terpolymers.
6. The composition of claim 1 wherein component (b) is present in an amount of about 1-5 weight percent.
7. The composition of claim 1 wherein the component (c) is present in an amount of about 2-6 weight percent.
8. The composition of claim 1 wherein component (d) is present in an amount of about 2-20 weight percent.
9. The composition of claim 1 which includes a flame retardant amount of a flame retardant agent.

* * * * *